United States Patent Office 3,263,615
Patented August 2, 1966

3,263,615
RELIEF VALVE CONTROL MECHANISM FOR SUCTION DREDGES
David L. Hofer, deceased, late of El Cerrito, Calif., by Marguerite M. Hofer, administratrix, El Cerrito, Calif.; by court decree to Marguerite M. Hofer
Continuation of application Ser. No. 227,983, Oct. 1, 1962. This application Feb. 3, 1964, Ser. No. 343,910
2 Claims. (Cl. 103—11)

This invention relates to a safety relief valve system on a hydraulic suction dredge; the present application being a continuation of application Serial No. 227,983, filed October 1, 1962, now abandoned.

The system is of the type which includes a normally closed underwater relief valve on the suction pipe above its intake end, and control mechanism arranged to cause opening of the relief valve upon such intake end of the suction pipe becoming plugged with mud or debris, and to cause closing of said relief valve upon the plug being relieved.

Opening of the relief valve permits water to surge into the suction pipe above its intake end, which effectively remedies the abnormal pumping condition caused by the plug, and prevents equipment damage which might otherwise occur.

Under a normal pumping condition, and due to the friction of the flowing water and entrained material, the vacuum in the suction pipe progressively increases from the intake end of such pipe to the pump. However, under an abnormal pumping condition due to a plug occurring at the intake end of the suction pipe and attendant stoppage of the flow therein, the vacuum equalizes throughout the length of such suction pipe. Thus, under a normal pumping condition there is a differential in the vacuum at longitudinally spaced points along the suction pipe, but under an abnormal pumping condition caused by a plug and with stoppage of the flow in such pipe, the vacuum equalizes at such points.

It is the major object of this invention to provide a novel control mechanism for a safety relief valve on a hydraulic suction dredge; such control mechanism being operative in response to the relative value of the vacuum in the suction pipe at such longitudinally spaced points therealong. More particularly, the control mechanism is operative to cause opening of the relief valve when—due to an abnormal pumping condition—the vacuum equalizes at such points, and to thereafter cause closing of the relief valve when—due to re-establishment of a normal pumping condition—there is a differential in the vacuum at said points.

Another important object of the invention is to provide a control mechanism, as in the preceding paragraph, which includes an electrical circuit and a differential vacuum switch interposed in such circuit; the switch having opposed chambers each connected in communication with the suction pipe at a corresponding one of such longitudinally spaced points.

It is also an object of the invention to provide a practical and reliable relief valve control mechanism, and one which will be exceedingly effective for the purpose for which it is designed.

These objects are accomplished by means of such structure and relative arrangement of parts as will fully appear by a perusal of the following specification and claims.

Figure 1:
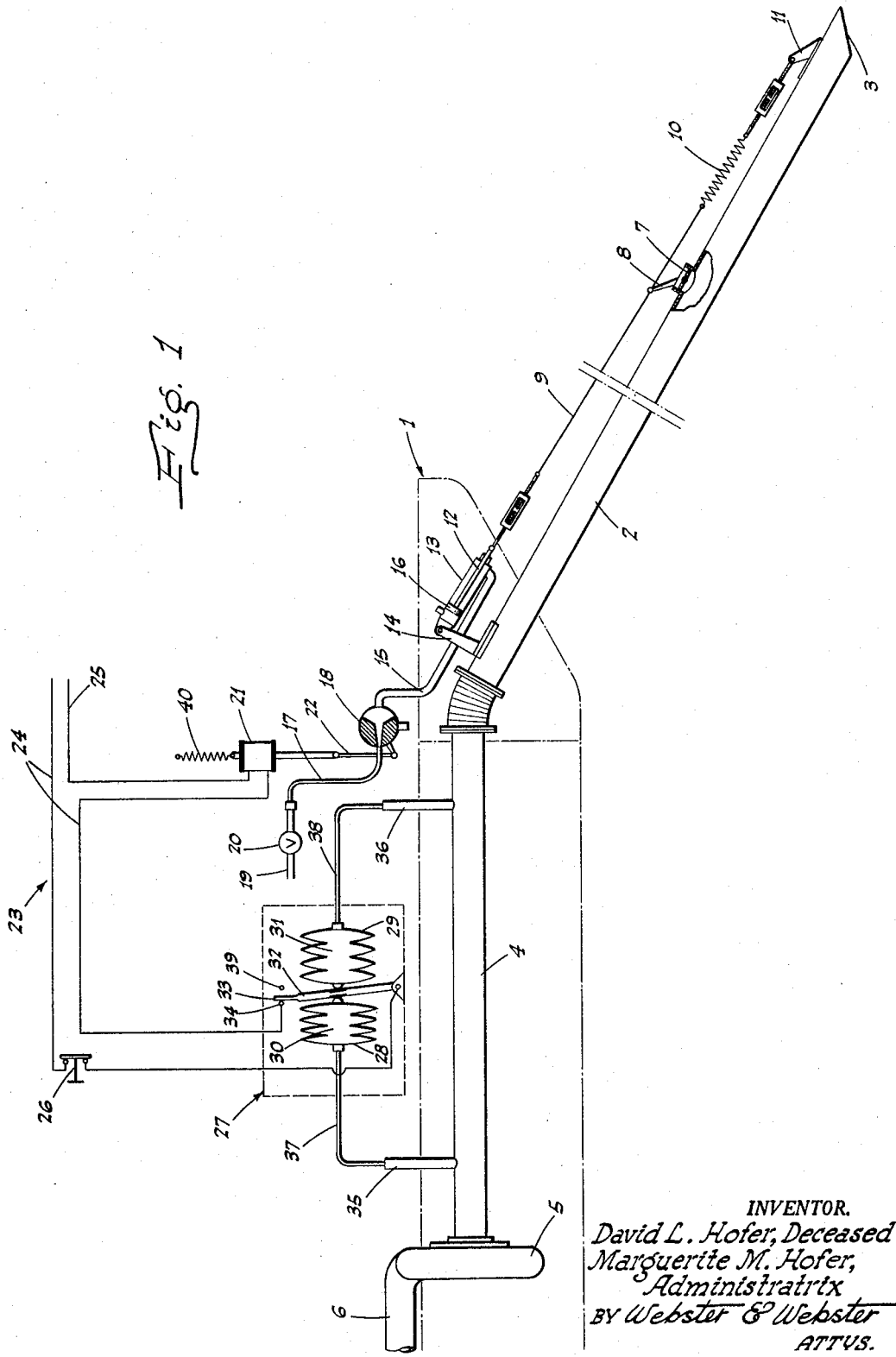
FIG. 1 is a diagrammatic elevation of a suction dredge relief valve system embodying the novel control mechanism; the view showing the parts under a normal pumping condition, and with the relief valve closed.

Referring now more particularly to the drawings, and to the characters of reference marked thereon, the dredge is indicated generally at 1, and a suction pipe 2 extends in part from the dredge at a forward and downward incline; the underwater intake end of the suction pipe being indicated at 3. In addition, the suction pipe 2 includes an elongated upper section 4, of substantial length, mounted on the dredge 1 and connecting in communication with the intake end of a heavy-duty motor driven pump 5 which delivers to a discharge pipe 6.

The suction pipe 2, adjacent but short of its intake end 3, is provided with a normally closed, butterfly type, safety relief valve 7 which includes an upstanding radial lever 8.

The control mechanism for the normally closed relief valve 7 comprises the following:

The lever arm 8 is connected to a longitudinal control cable 9 intermediate the ends thereof; the forward end of such control cable being attached to a tension spring 10 suitably anchored to the suction pipe 2, as at 11.

At its upper end the control cable 9 is suitably connected to the outer end of the piston rod 12 of a longitudinally extending, air pressure operated power cylinder 13 disposed above the suction pipe 2. At its rear end the power cylinder 13 is suitably anchored to the suction pipe 2, as at 14.

A conduit 15 connects to the forward end of the power cylinder 13 and normally supplies air pressure to said cylinder, with the result that its piston 16 is retracted, pulling on the control cable 9, and—against the tension of spring 10—holding the relief valve 7 closed.

Air pressure is normally fed to the conduit 15 from a pipe 17 through the medium of a three-way rotary valve 18; air pressure being delivered to pipe 17 from a supply pipe 19 having a normally open manual valve 20 therein. The three-way rotary valve 18 is normally maintained open between pipe 17 and conduit 15 by means of an energized solenoid 21 connected to said rotary valve by means of linkage 22.

The solenoid 21 is connected to an energizing circuit, indicated generally at 23, and which circuit includes leads 24 and 25. The lead 24 has interposed therein, in series, a normally closed manual switch 26 and a normally closed, relative or differential vacuum switch, of opposed bellows type, indicated generally at 27.

The differential vacuum switch 27 includes opposed inherently expanded bellows 28 and 29 defining chambers 30 and 31, respectively. Intermediate the bellows 28 and 29, and actuated thereby, is a pivotally mounted switch arm 32 including a switch blade 33 normally in engagement with a contact 34; the switch arm 32, together with the contact 34, being interposed in the circuit lead 24, as shown, so that when the switch blade 33 is in engagement with said contact 34 the circuit is closed, and which is normal.

At longitudinally spaced points in the length thereof the elongated upper section 4 of the suction pipe 2 is fitted with standpipes, indicated at 35 and 36; the standpipe 35 being connected in communication with the bellows 28 by a conduit 37, while the standpipe 36 is connected with the bellows 29 by a conduit 38.

When the dredge is operating under a normal pumping condition the vacuum in the suction pipe 2, including the elongated upper section 4, progressively increases in the direction of the pump 5. Hence, the vacuum imposed on the bellows 28 of switch 27 is greater than the vacuum imposed on bellows 29; this for the reason that the standpipe 35 is considerably closer to the pump 5 than the standpipe 36. With the switch 27 thus subject to differential vacuum, the bellows 28 is collapsed or shortened relative to the bellows 29, with the result that the switch 27 is closed; i.e., switch arm 32 is swung in a direction to close switch blade 33 with contact 34. See FIG. 1.

Under such condition, and which is normal, circuit 23 is closed; solenoid 21 is energized; and the rotary valve 18 is maintained in a position with the power cylinder 13 actuated, and which holds the relief valve 7 closed.

Upon a plug occurring at the intake end 3 of suction pipe 2 there is a stoppage of the flow in such pipe, and which immediately results in the vacuum therein, including the upper section 4 thereof, not only increasing beyond the limit of safety, but also equalizing throughout the length of the suction pipe.

Figure 2:
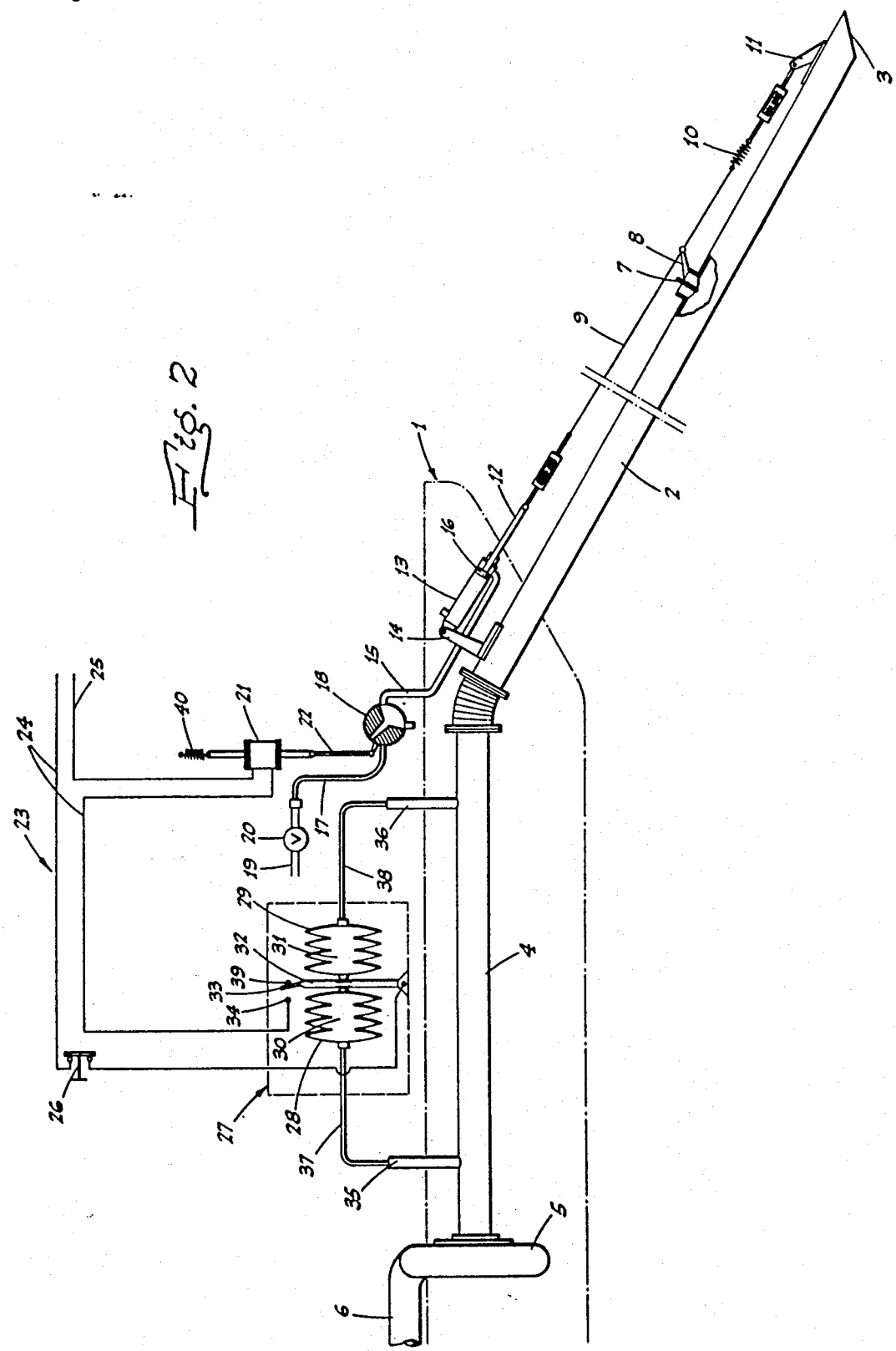
FIG. 2 is a similar view, but with the parts under an abnormal pumping condition, and with the relief valve open.

Immediately upon such occurrence the vacuum imposed on the bellows 28 and 29 likewise equalizes, and such bellows each become of equal effective length, swinging the switch arm 32 in a direction such that the switch blade 33 escapes the contact 34 and comes to rest against a stop 39. See FIG. 2. This breaks or opens the circuit 23 and de-energizes the solenoid 21, whereupon the pull-back spring 40 of such solenoid works through the linkage 22 to rotate the valve 18 to a venting position. In such venting position the air pressure in the power cylinder 13 escapes through the conduit 15, whereupon the spring 10, working through the control cable 9, not only pulls the piston rod 12 forwardly, but at the same time swings the lever arm 8 to open the relief valve 7.

Upon opening of the relief valve 7, water surges into the suction pipe 2 to relieve the abnormal pumping condition caused by the plug at the intake end of such pipe, and which abnormal pumping condition—with its high vacuum—would otherwise tend to cause equipment damage.

Upon the abnormal pumping condition caused by the plug being relieved, the vacuum in the suction pipe 2, including the upper section 4, again becomes differential; i.e., increases in such pipe from its intake end to the pump 5. Again, differential vacuum is imposed upon the bellows 28 and 29 of the switch 27, returning the latter to its closed position, whereupon the circuit 23 re-energizes the solenoid 21. Upon re-energization of the solenoid 21 the described control mechanism functions to reclose the safety relief valve 7, and which occurs by reason of the rotary valve 18 again being positioned to feed air pressure to the power cylinder 13, which then acts to pull on the cable 9 against the spring 10.

With the described control mechanism for the relief valve 7, the latter is automatically opened upon occurrence of an abnormal pumping condition caused by a plug at the intake end 3 of suction pipe 2, and automatically reclosed when such abnormal condition is relieved.

If at any time the operator of the dredge desires to open the relief valve 7 independently of the automatic functioning of the control mechanism, such operator opens the manual switch 26, and which switch is located in the pilot house. Upon switch 26 being opened, the relief valve 7 likewise opens in the same manner as when the circuit 23 is broken by automatic functioning of the differential vacuum switch 27.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent is desired:

1. In a suction dredge having a pump, a suction pipe leading to the pump, and a normally closed underwater relief valve on the pipe; means to close the valve and hold the same closed when pumping conditions are normal and a negative pressure differential exists along the suction pipe, and means to open the valve responsive to conditions of equalized pressure existing along the suction pipe as occasioned by a stoppage in the suction pipe at the water entry end thereof; said last named means including an electrical device which when energized prevents the valve from being opened, a circuit in which the device is interposed and having a switch interposed therein, the switch including a lever swingable in one direction or the other to close or open the switch, a pair of opposed vacuum chambers between which the lever is disposed, said vacuum chambers having adjacent movable ends engaging the lever on opposite sides thereof, and a pair of standpipes mounted on the suction pipe at relatively widely spaced points in the length thereof and communicating with said suction pipe and with corresponding chambers; one standpipe being located adjacent the pump; the last named standpipe being connected to that one of the chambers which will cause the movable end thereof to be drawn away from the lever so that the latter will be moved in said one direction to a switch closing position when the negative pressure in said nearest standpipe exceeds that in the other standpipe, and will be moved in said other direction to a switch opening position when the negative pressure in both standpipes is equalized.

2. In a suction dredge having a pump, a suction pipe leading to the pump, and a normally closed underwater relief valve on the pipe; means to close the valve and hold the same closed when pumping conditions are normal and a negative pressure differential exists along the suction pipe, and means to open the valve responsive to conditions of equalized pressure existing along the suction pipe as occasioned by a stoppage in the suction pipe at the water entry end thereof; said last named means including an electrical device which when energized prevents the valve from being opened, a circuit in which the device is interposed and having a switch interposed therein, the switch including a lever swingable in one direction or the other to close or open the switch, a pair of opposed inherently expanded bellows between which the lever is disposed, said bellows having adjacent movable ends in engagement with opposite sides of the lever whereby relative differential movements of the bellows will impart corresponding movements to the lever, and a pair of standpipes mounted on the suction pipe at relatively widely spaced points in the length thereof and communicating with the suction pipe and with corresponding bellows, one of said standpipes being located in closely spaced relation to the pump; the switch being arranged so that it will be closed by bellows movement against the lever caused by a greater negative pressure in the standpipe nearest the pump and the related bellows than in the other standpipe and the corresponding bellows, and will be opened by bellows movement against the lever caused by equalized negative pressure in both standpipes.

References Cited by the Examiner

UNITED STATES PATENTS

| 1,847,086 | 3/1932 | Gargan | 73—407 |
| 2,224,295 | 12/1940 | Hofer | 103—11 |
| 2,572,263 | 10/1951 | Hofer | 103—11 |
| 2,662,547 | 12/1953 | Cameau | 137—486 |
| 2,889,779 | 6/1959 | Hofer | 103—97 |
| 3,111,778 | 11/1963 | Fonnesbeck | 103—11 |

MARK NEWMAN, *Primary Examiner.*

SAMUEL LEVINE, *Examiner.*

W. L. FREEH, *Assistant Examiner.*